Patented Mar. 14, 1933

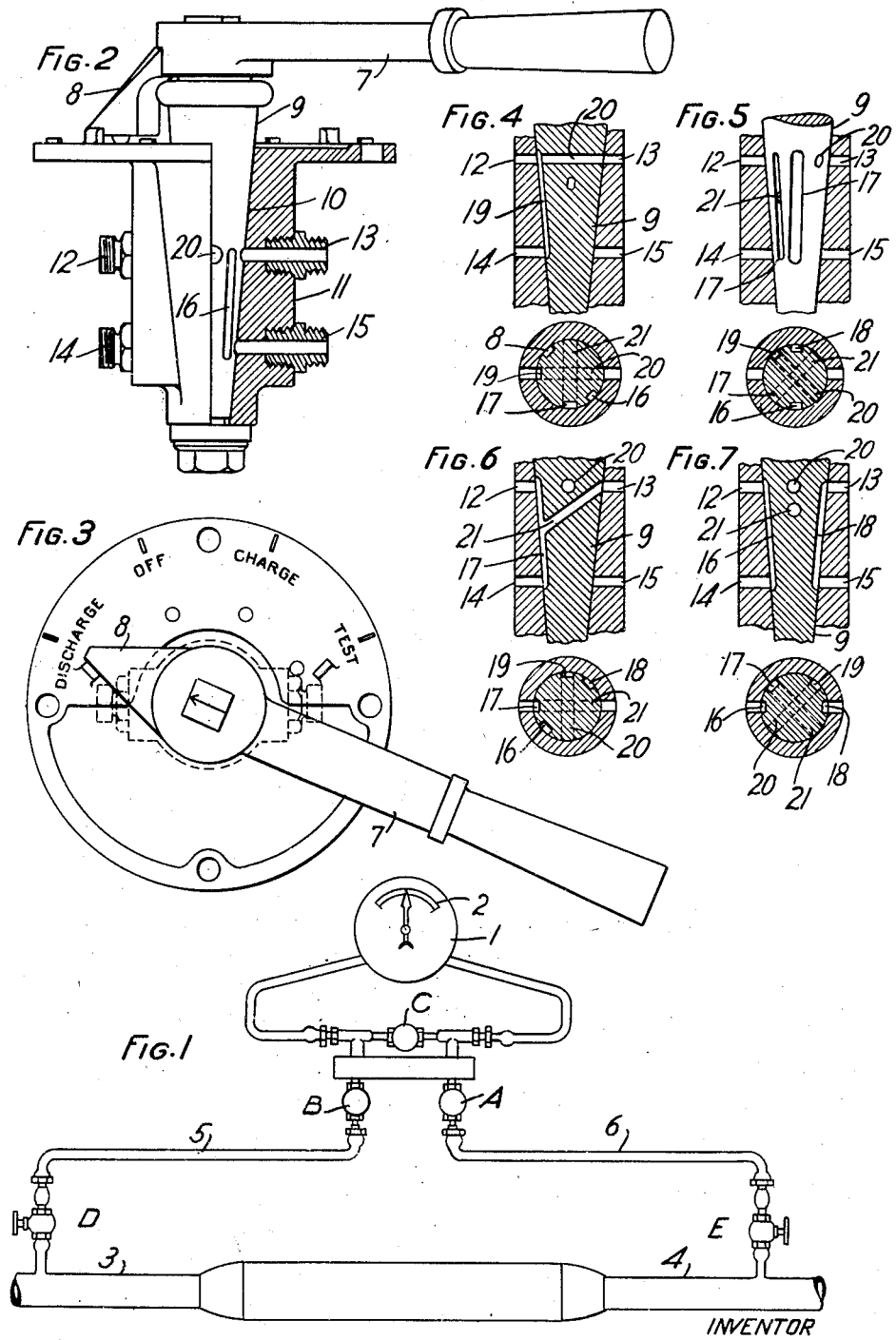
March 14, 1933.  R. W. BRADLEY  1,901,432
PRESSURE LEAK INDICATOR
Filed July 21, 1930  2 Sheets-Sheet 1
INVENTOR
R.W. BRADLEY
BY J. MacDonald
ATTORNEY

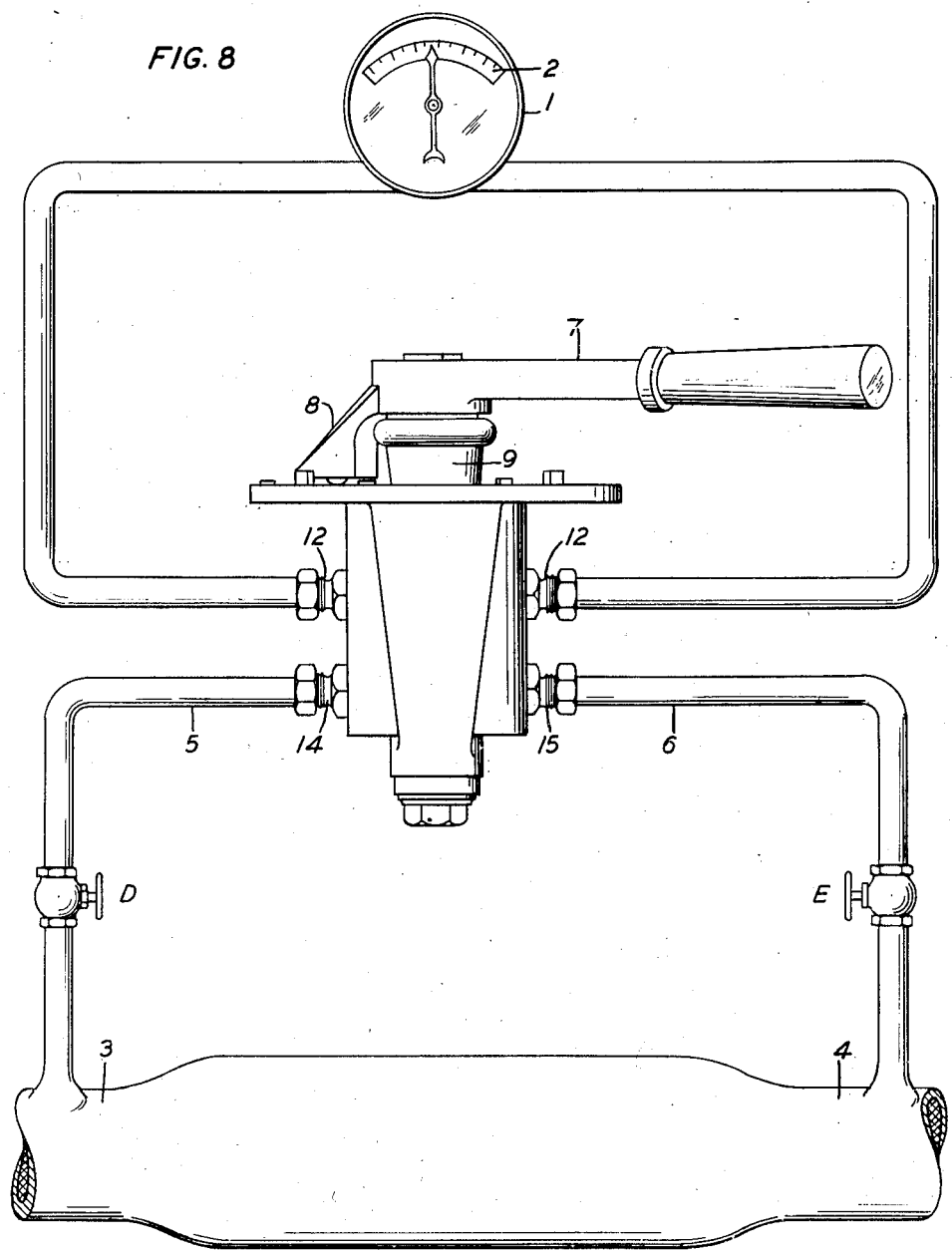

1,901,432

UNITED STATES PATENT OFFICE

ROBERT WALTER BRADLEY, OF ALDWYCH, LONDON, ENGLAND, ASSIGNOR TO WESTERN ELECTRIC COMPANY, INCORPORATED, OF NEW YORK, N. Y., A CORPORATION OF NEW YORK

PRESSURE LEAK INDICATOR

Application filed July 21, 1930, Serial No. 469,609, and in Great Britain November 20, 1929.

This invention relates to improvements in gas pressure indicators and more particularly to gas pressure leak indicators.

Heretofore it has been found difficult to locate mechanical defects causing a leak in the tubular members such as the lead sheath of telephone or similar air or gas containing cables. In order to locate such mechanical defects causing a leak of the air or gas, it has been the practice up to now to open up a number of joints and apply gas under pressure to the sub-sections of cable. If the applied pressure falls after a certain period of time, it indicated that the mechanical defect was located in the section under test.

According to this invention the fault in the tube containing gas or air under pressure is located by a novel form of control valve combined with a differential pressure gauge connected to the tube at intervals, as for instance, at the joints of the telephone cable and a differential pressure in the tube or cable each side of the point of test is admitted to each corresponding side of the diaphragm of the differential pressure gauge.

In order that the invention may be more fully understood, two embodiments of the invention will be described below and illustrated in the accompanying drawings in which Fig. 1 shows the general arrangement of a pressure leak indicating system as applied to telephone cables.

Fig. 2 shows an elevation of a multiple way cock to be used in connection with the pressure leak indicator.

Fig. 3 shows the plan of the cock illustrated in Fig. 2.

Fig. 4 shows vertical and cross sections of the cock illustrated in Figs. 2, 3 and 8 at the "Discharge" position.

Fig. 5 shows vertical and cross sections of the cock shown in Figs. 2, 3 and 8 at the "Off" position.

Fig. 6 shows vertical cross sections of the cock shown in Figs. 2, 3 and 8 at the "Charge" position.

Fig. 7 shows vertical cross sections of the cock shown in Figs. 2, 3 and 8 at the "Test" position.

Fig. 8 shows the multiple way cock of Figs. 2 and 3 connected to a cable.

The invention will now be described more fully in its application to locating leaks in telephone cables.

In a section of metallic sheathed cable, consisting of several manufactured lengths jointed together, in which it has been found that an applied gas pressure is not maintained after the gas supply has been cut off and all connecting pipes, cocks and such like sealed, there will be a flow of air from each end of the section towards the point at which the gas escapes. Consequently, the pressures existing at any two points 3, 4 on one side or the other of the leaking point will be at different levels, the amount of the difference depending on the size of the leak and the distance apart of the two points 3, 4 selected. If these two points 3 and 4 are connected one to each side of the differential pressure gauge (1), the consequent displacement of the index (2) will be a measure of the pressure slope between the two points selected. From this information can be deduced the direction of the leak in relation to the points of application of the indicating gauge.

Fig. 1 shows an arrangement for carrying out such leak locating test.

At each or at certain selected accessible points of the cable, such as the joint boxes, two cocks D and E spaced certain and preferably standard distances apart are fixed to the cable sheath. To these cocks D and E are connected pipes 5 and 6, the other ends of which connect to cocks B and A of the indicating apparatus.

When the indicator is connected to the cable as described, cocks A and B are closed and cock C is opened. Cocks D and E are next opened and either the cock B (or cock A) is slowly opened and the pressure is admitted equally to both sides of the diaphragm of the indicator gauge as with cock C opened free access to both sides of the diaphragm is obtainable. Next the cock A (or B) is opened slowly.

The steady position of the pointer is at zero position and it also indicates that the pressure has steadied in the connecting pipes and the test can proceed. Cock C is now closed and with the closing of cock C the pressure on the two sides of the diaphragm changes and corresponds to the pressure in the cable at the points where the cocks D and E are attached.

The direction of movement of the pointer of the gauge is an indication of the direction in which the leak is situated.

The cocks D and E may be of the type which automatically open when the connecting pipes 5 and 6 are fixed to them thus making the connection easy and escape of gas or air negligible.

In place of the three cocks A, B and C shown in Fig. 1 a multiple way cock shown in Figs. 2 and 3 can be used.

Fig. 2 shows an elevation, partly in section of the multiple-way cock, Fig. 3 shows a plan of the same and Fig. 8 shows the multiple way cock substituted for the cocks A, B and C. This cock is provided with a number of operating positions by means of which the various operations as described above in connection with Fig. 1 can be carried out in their proper order and sequence. The use of this multiple way cock also facilitates the testing and prevents wrong connections which may cause damage to the indicator. This multiple way cock consists of a tapered barrel 9 bearing in a tapered hole 10 provided in the body 11. The barrel 9 is provided with a handle 7 which carries a pointer 8. The body of the cock is provided with four admittance orifices 12, 13, 14 and 15 each fitted with a threaded connecting nipple. Two of these admittance orifices 12 and 13 are used to connect the gauge and the other two 14 and 15 for connecting the cable to be tested. On the drum 9 are provided four axially located grooves 16, 17, 18 and 19 and two transverse bores 20 and 21 by means of which the various interconnections of the gauge outlets 12 and 13 and the cable pressure inlets 14 and 15 are effected.

The multiple way cock shown in Figs. 2, 3 and 8 is provided with four operating positions, namely, "discharge", "off", "charge" and "test". The sequence of operations of the pressure leak indicator when employing the multiple way cock is as follows:—

Before the indicator is connected to the cable, the gauge is discharged by turning the pointer to "Discharge" so that the pressure is equalized within the gauge. Fig. 4 shows vertical and cross sections through the cock at the "discharge" position.

As will be seen the two openings to the gauge, namely, 12 and 13 are both connected by means of the bore 20 and the groove 19 to the opening 14 which connects to outside air when the indicator is not connected to the cable. The pressure within the gauge is consequently brought to the atmospheric pressure and is equal on both sides of the diaphragm.

Fig. 5 shows the "off" position of the multiple way cock at which position no interconnections are made and the gauge is isolated. The indicator is now connected to the cable and the cocks D and E are opened.

The next position on the multiple way cock is the "Charge" position. Fig. 6 shows the vertical and cross sections of the cock at this position. The openings 12 and 13 are connected by means of the bore 21 and the groove 17 to the outlet 14 leading to the cock D on the cable. Pressure from the side of the cable to which cock D is connected is consequently admitted equally to both sides of the diaphragm of the gauge. The zero position of the indicator pointer of the gauge can now be checked before the cock is turned to the "test" position.

The vertical and cross sections of the cock in the "Test" position are shown in Fig. 7. One side of the diaphragm of the gauge is connected through the opening 12, groove 16, opening 14, pipe 5 and cock D to one point of the cable under test. The other side of the diaphragm is connected through opening 13, groove 18, opening 15 and pipe 6 and cock E to the other point of the cable under test. Consequently to each side of the diaphragm, pressure from the cable at points where the cocks D and E are fixed is admitted and the difference in these pressures is indicated by the position of the pointer.

The sensitivity of the gauge may be increased by affixing a small concave mirror of suitable focal length at the pivot of the index needle. A beam of light may then be directed on to this mirror so that an image will be thrown on a ground glass scale placed in the plane of the reflected beam at a suitable distance from it. The deflection obtained, by observing the movement of the spot on the ground glass scale, will be greater than the movement of the tip of the pointer by the ratio of the length of the pointer to the distance the mirror is placed from the ground glass scale.

What is claimed is:

1. In combination with a gas filled cable, a pressure indicating device connected thereto, a means located between said indicating device and said cable for controlling the passage of gas to said indicating device from said cable, said controlling means comprising a single valve mechanism, an operating handle thereon, said valve being designed to be operated to permit a flow of gas from one source to both sides of said indicating device in one position, from each of two sources to each of two sides, respectively, of said device in another position, and completely stopping the passage of gas in another position.

2. In combination with a gas filled cable, a pressure indicating device, said pressure indicating device connected across the cable by means of two pilot tubes, means located between said cable and said indicating device and connected to said pilot tubes for controlling the passage of gas from said cable to said indicating device, said controlling device comprising a valve having a single operating handle, said valve being designed to be rotated to permit a flow of gas through one of said pilot tubes to both sides of said indicating device when in one position, through both of said pilot tubes to said indicating device when it is set in another position, and completely stopping the passage of gas when it is in another position.

3. In combination with a gas filled cable, a pressure leak indicator comprising a differential pressure gauge, two pilot tubes connecting said indicator to the cable to be tested, a means in the line of said pilot tubes between said cable and said indicator for controlling the passage of gas from said cable to said indicator, said means comprising a valve having a single operating handle, said valve being designed to be rotated to permit a flow of gas either through one or both of said pilot tubes, or for completely stopping the passage of gas.

In witness whereof, I hereunto subscribe my name this 25th day of June, 1930.

ROBERT WALTER BRADLEY.